United States Patent
Register, Jr. et al.

(10) Patent No.: US 7,344,068 B2
(45) Date of Patent: Mar. 18, 2008

(54) SECURITY CLEARANCE CARD, SYSTEM AND METHOD OF READING A SECURITY CLEARANCE CARD

(75) Inventors: Arthur F. Register, Jr., Altamonte Springs, FL (US); Frank J Camper, Hueytown, AL (US)

(73) Assignee: Digital Data Research Company, Altamonte Springs, FL (US)

( * ) Notice: Subject to any disclaimer, the term of this patent is extended or adjusted under 35 U.S.C. 154(b) by 0 days.

(21) Appl. No.: 11/539,703

(22) Filed: Oct. 9, 2006

(65) Prior Publication Data

US 2007/0119924 A1    May 31, 2007

Related U.S. Application Data

(62) Division of application No. 10/272,464, filed on Oct. 16, 2002, now Pat. No. 7,137,553.

(60) Provisional application No. 60/365,068, filed on Mar. 14, 2002, provisional application No. 60/361,458, filed on Mar. 4, 2002, provisional application No. 60/344,658, filed on Dec. 31, 2001.

(51) Int. Cl.
 *G06K 5/00* (2006.01)
(52) U.S. Cl. .................. 235/382; 235/382.5; 235/380
(58) Field of Classification Search ............. 235/382, 235/382.5, 380; 340/5.2–5.33, 5.8–5.85
See application file for complete search history.

(56) References Cited

U.S. PATENT DOCUMENTS

| | | | | | |
|---|---|---|---|---|---|
| 5,245,329 | A | * | 9/1993 | Gokcebay | ............... 340/5.33 |
| 6,049,055 | A | * | 4/2000 | Fannash et al. | ........ 219/121.66 |
| 2001/0034717 | A1 | * | 10/2001 | Whitworth | ............... 705/64 |
| 2001/0038588 | A1 | * | 11/2001 | Nagatomo et al. | ........ 369/53.22 |
| 2002/0020740 | A1 | * | 2/2002 | Aarons | ................ 235/380 |
| 2002/0138769 | A1 | * | 9/2002 | Fishman et al. | ............ 713/202 |
| 2003/0110130 | A1 | * | 6/2003 | Pelletier | ................ 705/50 |
| 2003/0128099 | A1 | * | 7/2003 | Cockerham | ............... 340/5.7 |

FOREIGN PATENT DOCUMENTS

JP        2000293970 A    * 10/2000

* cited by examiner

*Primary Examiner*—Michael G. Lee
*Assistant Examiner*—Kristy A. Haupt
(74) *Attorney, Agent, or Firm*—Morris Manning & Martin LLP (57) ABSTRACT

The security clearance card, system, and method include a card that stores data to verify the identity of an owner of the card. In addition to other types of information, the card stores biometric data of the owner and other identity data. Different portions of the data may be encrypted with different encryption techniques based upon a predetermined level of security assigned to the portions of the stored data. Reader elements are then capable of reading at least a portion of the encrypted data stored on the security clearance card, and receiving at least one biometric from an individual. The biometric stored in the card is then compared with the biometric of the individual presenting the security clearance card to verify that the holder of the card is the owner of the card.

27 Claims, 4 Drawing Sheets

| | | Users | | | | | | | | | | | |
|---|---|---|---|---|---|---|---|---|---|---|---|---|---|
| Class | | Card Readers | | | Operators | | | Card Owners | | | Downstream Applicatons | | |
| SubClass | | CR1 | CR2 | CR3 | OP1 | OP2 | OP3 | CO1 | CO2 | CO3 | AP1 | AP2 | AP3 |
| Data Level | Sublevel | | | | | | | | | | | | |
| | 1 | | X | | | X | X | | X | X | X | X | X |
| 1 | 2 | | X | | | X | X | | X | X | X | X | X |
| 2 | 3 | | X | | | | X | | X | | X | | | X |
| 3 | 4 | | X | | X | | | | X | | | X | | |
| 4 | 5 | | X | | X | | | | | X | | | | |
| 5 | 6 | | | X | X | X | | | | | X | | | |
| 6 | 7 | | | X | | | X | | X | | | | X | |
| | 8 | | | X | X | | X | | | X | X | | X | |
| 7 | 9 | | | X | X | | X | | | X | X | | X | |
| 8 | 10 | | | | X | | X | X | | | | | X | |
| 9 | 11 | | | | | | X | | | | X | | X | |
| 10 | 12 | | | | | | | | | | | | X | |

| Data | | Class | Users | | | | | | | | | | | |
|---|---|---|---|---|---|---|---|---|---|---|---|---|---|---|
| | | | Card Readers | | | Operators | | | Card Owners | | | Downstream Applications | | |
| Level | Sublevel | SubClass | CR1 | CR2 | CR3 | OP1 | OP2 | OP3 | CO1 | CO2 | CO3 | AP1 | AP2 | AP3 |
| 1 | 1 | | X | | | | | | | | | | | |
| 1 | 2 | | X | | | X | X | | | | | X | X | |
| 2 | 3 | | X | | | | X | | X | X | X | X | | X |
| 2 | 4 | | X | | X | | | | X | X | X | X | | |
| 3 | 5 | | X | | X | X | | | | | X | | | |
| 4 | 6 | | | X | X | | | | X | | | | | |
| 5 | 7 | | | X | X | | X | | | X | X | | X | |
| 6 | 8 | | | X | X | X | X | | X | X | X | | X | |
| 7 | 9 | | | | X | | X | | | | X | | X | |
| 8 | 10 | | | | | | | X | X | | | | X | |
| 9 | 11 | | | | | | X | | | | | | X | |
| 10 | 12 | | | | | | | | | | | | X | |

FIG. 6

SECURITY CLEARANCE CARD, SYSTEM AND METHOD OF READING A SECURITY CLEARANCE CARD

CROSS-REFERENCE TO RELATED APPLICATIONS

The present application is a divisional of currently-pending U.S. Nonprovisional patent application Ser. No. 10/272,464, entitled "Security Clearance Card, System and Method of Reading a Security Clearance Card," filed Oct. 16, 2002, which claims priority to the following U.S. Provisional Patent Applications: U.S. Provisional Patent Application No. 60/344,658, entitled: AUTOMATIC IDENTITY VERIFICATION SYSTEM filed on Dec. 31, 2001; U.S. Provisional Patent Application No. 60/361,458, entitled: CD/ID—A LOW COST SOLUTION TO SECURE ID AND DATA STORAGE filed on Mar. 3, 2002; and U.S. Provisional Patent Application No. 60/365,068, entitled: SECURITY SYSTEM HAVING IMPROVEMENTS filed on Mar. 14, 2002, all of which are hereby incorporated by reference in their entirety.

BACKGROUND OF THE INVENTION

1. Field of Invention

The present invention is related to security systems in general, and more specifically directed to a security system that uses security clearance cards with increased storage space and increased security for information store thereon, and a security system that selectively controls access to data on the card by different card readers and operators, as well as selective controlled access to different portions of a facility by a cardholder.

2. Description of Related Art

Most companies and governmental entities use security systems to control access to facilities, data, etc. Access is typically controlled through the use of security clearance cards and/or password access. Many conventional security systems are electronically operated through the use of card readers, biometric scanners, and the like. Further, many conventional security systems are network based. Specifically, these systems use a centralized data server that contains security access codes and data related to personnel allowed access to a facility, data, etc., such as a security identification number associated with the personnel and/or stored biometrics associated with the personnel. In general, these conventional security systems operate in a centralized networked mode, which can slow access decision-making. Further, the clearance cards used in these systems may be rudimentary in that they only include tokens used to identify data associated with the user located in the server, or the cards may include processors and memory that may be easily compromised. Conventional security systems also typically do not include complex decision-making concerning access to facilities and locations. Specifically most systems only use a standard entry/no-entry decision-making and do not allow for dynamic alteration of access criteria. Finally, many conventional security systems do not have the ability to limit access to different levels of information stored on a security clearance card by different security readers and security employees. These issues are discussed more fully below.

Security clearance cards are typically issued to individuals who have been approved to access a particular location, object, information, electronic media, and/or any other tangible or intangible item to which access is limited. For example, organizations that include items to which access is restricted, usually issue security clearance cards to those individuals who the organization deems authorized to access the items. The security clearance cards therefore may carry some type of information, indication and/or means that that permit the person carrying the card to access one or more restricted items, For example, a card may include visual information so that a security guard or other personnel may visually inspect the card to ensure that the card is valid, and/or the card may include information that allows automated access to the restricted item.

Usually individuals must undergo some type of background check prior to issuance of a security clearance card, such as by providing evidence of their identity, i.e. a birth certificate, proof of address, drivers license, social security card, visa, passport, and/or any other information that demonstrates the individual's identity. In addition individuals may have to provide detailed information regarding their background, such as education, prior jobs, affiliations, and/or any other information regarding the individual's history that is pertinent to the particular type of background check. Once the desired information regarding the individual is accumulated, it may be verified in whatever manner is acceptable to the organization to ensure that the information is valid.

Some conventional security cards may include bar codes, magnetic strips, and/or other similar type(s) of data storage devices, for encoding data associated with the individual to whom the card is issued. The cards may also include other types of data in addition to the basic identity and access data described above.

In some security systems, a biometric of the cardholder is used for verification. In these systems, one or more biometrics of the cardholder, such as a fingerprint, a retina scan, a voice sample, DNA sample or the like, are taken of the cardholder and stored on a centralized database of the security system. A token or other identifier is then stored on the card in the form of a bar code or similar encoded device. In operation, when the holder presents the card to a card reader, the token associated with a biometric is read. The security system uses the token to then poll the network database to retrieve the token associated with the holder. Further, the holder also has their biometric scanned with a biometric scanner connected to the security system. The security system compares the scanned biometric taken from the scanner with the stored biometric taken from the card to determine whether the person presenting the card is the registered cardholder.

As mentioned, the biometric identifier is typically not stored directly in the security card. Instead, a token is stored in the card, and the token provides the information necessary to query a remote database in which the biometric identifier associated with the owner of the card is stored. Therefore, a card reader may read the token stored in the card, and then query the appropriate remote database based upon the instructions provided by the token. In this instance, the card reader must be in continuous or semi-continuous communication with the remote database in order to verify the cardholder. In other words, the comparison of the stored biometric with a scanned biometric is dependent upon the card reader's capability to communicate with the remote database. In addition, the integrity of the stored biometric is dependent upon the integrity of the remote database. The biometric comparison may easily be jeopardized because communication between the card reader and the remote database may be blocked, and/or the remote database may become intentionally or inadvertently corrupted. Further, there may be added delay associated with polling and retrieving the biometric from the remote database. Also, the requirement of a network connection for card readers may not be practical for instances where the security system is used at a remotely located security checkpoint.

Another disadvantage of many conventional security card systems is storage capacity. The amount of data that can be stored in these conventional cards may be limited by the amount of data that may be encoded into the bar code, magnetic strip and/or others similar type(s) of data storage means printed on the face of the card.

Recently, business cards have been developed that use a CD-ROM for data storage. These business cards include a CD-ROM that has been shaped to resemble a card. Located on a surface of the CD-ROM is business data related to the card owner, such as name, title, company, address, phone number, etc. These business cards are advantageous as they allow for added storage of data on the CD-ROM. For instance, CD-ROM cards have been utilized to store data about a company associated with the card owner. This data can be viewed by a recipient of the business card via a conventional CD-ROM player.

Although CD-ROM business cards increase the amount of data that can be stored in a card, these conventional cards are not suitable for use in a security setting. Specifically, while these conventional business cards include information on the front of the card such as name, company, address, etc. and additional marketing information about the company stored on the CD-ROM, there is typically no information either printed on or stored in the card that verifies to a recipient that the card belongs to the card owner. Therefore, if an individual presents a CD-ROM card, there is no way to ensure that the CD-ROM card belongs to that individual, or that the data carried by the card is associated with the individual.

Smart cards have also been developed for use in security systems. Smart cards include either an embedded memory or both an embedded memory and a processor. These cards allow for additional data information storage on the security card. Further, the processor can be used to perform processing of data stored in the memory. These cards, however, also may have associated security issues. Specifically, smart carts are susceptible to hacking. Once the procedures for reading and writing to the memory of the smart card are determined, the security data on the card can be easily accessed an changed. As such, the card could be either compromised or altered for used by a non-authorized person.

In addition to the shortcomings associated with conventional security clearance cards, there are also some shortcomings with the security systems themselves. One issue is limiting data access. Specifically, it may be desirable to include a wide range of data on a security card, where some of the data is more sensitive than other portions of the data. For example, in addition to data for verifying the cardholder, the card may also include personal data about the cardholder such as financial, medical, and criminal records. In this instances, it is important to limit access to the personal data, while at the same time allowing access to data for verifying the owner of the card. Unfortunately, for many conventional security cards, this is not possible. There typically is no way to ensure that personnel operating a card reader cannot access all of the data stored on the card. Therefore, typically anyone capable of reading the card is authorized to view all of the data stored on the card, which may limit the type of data a card owner will be willing to store on the card, unless the only person accessing the data carried by the card is the owner of the card.

An additional problem with many conventional security systems is flexibility in deciding who does and who does not have access to a facility or data, or anything else to which security is required. Specifically, many conventional systems operate on "go/no go" decision-making. The list of those allowed access to a certain facility, data, etc., is hard coded in the system and cannot be altered dynamically. For example, an individual may originally have authorization to access one portion of a facility, but not another portion of the facility. For many conventional security systems, the list of individuals provided access to the second portion of the facility will have to be manually updated with the individual's information and then provided to the card reader or security gate at the second portion of the facilities entrance. This can be time consuming, especially in situations where the list of individuals allowed access to a facility is altered on a regular basis.

In light of these shortcomings in the prior art, there is a need for a security card that is capable of carrying large amounts of data, while also providing means for verifying the identity of an owner of the card. Cards are also needed that are less tamper proof and provide added data security. In addition, there is a need for such a card that limits access to different levels of data stored on the card based on the security level of the individual attempting to gain access to the information. Needs also exist for security systems that do not require constant connection to a network to verify security information, as well as security systems that allow for dynamic updating of information related to who is allowed access to facilities.

BRIEF SUMMARY OF THE INVENTION

The present invention remedies the above-mentioned as well as many other concerns noted in the prior art. Many of the advantages of the security system of the present invention are summarized below and detailed later.

The present invention provides a security system that uses a security clearance card having significant data storage capacity, while also providing different features for verifying the identity of the card owner. Further, the security clearance card of the present invention provides a self-contained security check system, such that the card reader of the security system used to verify the card does not require a constant network connection.

Specifically, the security system of the present invention provides a security clearance card capable of storing multiple portions of data. At least one biometric identifier of the owner of the card is stored in at least one of the data portions. Other data portions may include a wide variety of information about the cardholder, such as a profile of the holder, banking records of the holder, criminal record, etc. In addition, each data portion may be associated with a security level such that different types of data may have a different level of security.

The data portions may be stored in different ways depending on the type of security card used. For example, a security card comprising a CD-ROM may be used; in which case, the data is stored in the CD-ROM. The card may additionally or alternatively include a data storage medium located on the surface of the card, such as a bar code, hologram, etc. that stores the data. Further, the security clearance card of the present invention may be embodied in a smart card, where the data is stored in the memory portion of the card.

As mentioned, the security clearance card of the present invention includes stored therein at least one biometric of the cardholder. This allows the security system associated with the card to operate independent of a network. Specifically, the security system of this embodiment will include a device for reading the card and a device for scanning a biometric of the user. In operation, a biometric of the user is scanned and the previously stored biometric of the cardholder is retrieved either from the data stored in the card in the case of a CD-ROM or smart card, or from the storage media on the face of the card, in the case of a bar code or hologram stored on the face off the card. The stored and scanned biometric are then compared to verify that the individual presenting the card is the owner of the card. By placing the biometric data on the security clearance card itself, the security, system is not required to poll a remote database located on a network to retrieve this data.

This provides several advantages. First, biometric data for all cardholders are not required to be stored all on the same central database, where the data for all cardholders may be compromised, stolen, or otherwise corrupted. Further, the security clearance card of the present invention does not require transmission of secure data over a network, where the data may be intercepted. Further, it allows security checkpoints to be either fully or partly free of a network connection, such that the checkpoints are self-contained and can be located at remote locations.

As mentioned, the security clearance cards of the present invention typically include a wide variety of data stored thereon related to the cardholder or associated with the cardholder. In addition to data used to verify the owner of the card, such as biometric data, the security card may include information data concerning the cardholder. This data may include general data about the user, but may also include more security sensitive data, such as financial data, medical, data criminal records, etc. Given the wide range of data that can be located on the card, it is important to limit access to the data. In light of this, the data stored on the security card of the present invention is stored under different levels. Access to these levels is then restricted from being viewed by others. Different levels of access are assigned to operators and/or devices in the security system of the present invention, such that the data can only be read by those who have been designated to view data appearing at certain levels.

The security system of the present invention may also allow for data read from a security clearance card to be passed to other devices in the security system. Specifically, the clearance security card may include data stored under different levels that are restricted in terms of access. A card reader may scan all of the data from the card, but only be able to read certain portions of the data due to limited security access. Other portions of the data, however, may be passed to other devices in the security system, which are capable of reading the other levels of restricted data. In this manner, data from the card can be retrieved by the card reader, and although not understandable by the card reader, can be passed to other devices at higher levels of security, which have authority to read the data.

As an example, a card reader may only have access to data on the card needed to verify the holder of card and allow access to a facility. However, portions of the data related to the holder's police record may be read by the card reader, and although not decipherable the card reader, forwarded to another device connected to the reader, where it can be viewed to determine whether the person presents a security risk.

A log of events related to the card may also be stored in the card. For example, a log of the modifications and additions to the data portions, the creation of the card, and/or the biometrics received from holders of the card, may be stored in the card. This audit log enables security personnel to track use of the card, as well as possible breaches or attempts at breaching the security of the card.

The security clearance card of the present invention may also allow for storage of information related to start dates, verification dates, etc. Specifically, the card may include an expiration date that can be read via the card reader. If the card has exceeded the selected expiration date, the holder will be denied access. This is important to guard against theft of the card. Despite the fact that the card has been stolen, the card can only be used for a limited time. Further, a start date may be included on the card. The start defines a time when the card will become valid. Use of the card prior to the start date will be denied by the security system. An origination date may also be stored on the card. This origination date could be used in a scheme in which encryption methods used to encrypt data on cards is changed from time to time. Specifically, for a range of dates, cards produced during those dates may be encrypted using, one method, while a separate method is used for another range of dates. When the card is read, the origination date is also read. Based on the origination date, the card reader will know which encryption scheme to use to read the data from the card.

To guard the integrity of the data the security system of the present invention typically, but does not always, use a "write once/read many times" procedure for storing data on the card. The write once/read many times procedure prevents overwriting of the security data on the card, which might be attempted by someone seeking to gain fraudulent access using the card.

The data on the card may be encrypted with at least one of a variety of encryption techniques. In particular, different portions of the data may be encrypted with different encryption techniques based upon the level of security assigned to the portions of the stored data. The encryption techniques may include a variety of algorithms that are utilized to encrypt at least a portion of the data stored on the card. For example, the algorithms may be block cipher encryption algorithms.

The security system of the present invention also allows for dynamic changes to the list of those allowed access to a certain locations of a facility, data, etc. Specifically, via a network, the list of individuals allowed access to a particular location can be altered or otherwise updated remotely and stored with the card reader. When a card is scanned by the reader and the holder has been verified, the card reader can access the list and determine whether the holder of the card has been designated as someone having access to the facility. If the holder is not on the list, access to the facility is denied.

As an alternative, the security level of the secure location may be altered, thereby changing the list of card owners allowed access. For example, if the secure location had a first security level that only allowed access to a small number of card owners, the security level associated with the secure location can be lowered thereby allowing access to more card owners.

BRIEF DESCRIPTION OF THE SEVERAL VIEWS OF THE DRAWING(S)

Having thus described the invention in general terms, reference will now be made to the accompanying drawings, which are not, necessarily drawn to scale, and wherein:

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The present invention provides a security clearance card that remedies many of the above-mentioned concerns with the prior art. Specifically, the present invention provides a security clearance card to allow for significant data storage capacity, while also providing different features for verifying the identity of the card owner. In addition, the security clearance card of the present invention, in conjunction with a card reader, is capable of associating portions of the data stored on the card with various security levels, and limiting the amount of data a card reader and/or an operator of the card reader may view and/or access.

Figure 1:
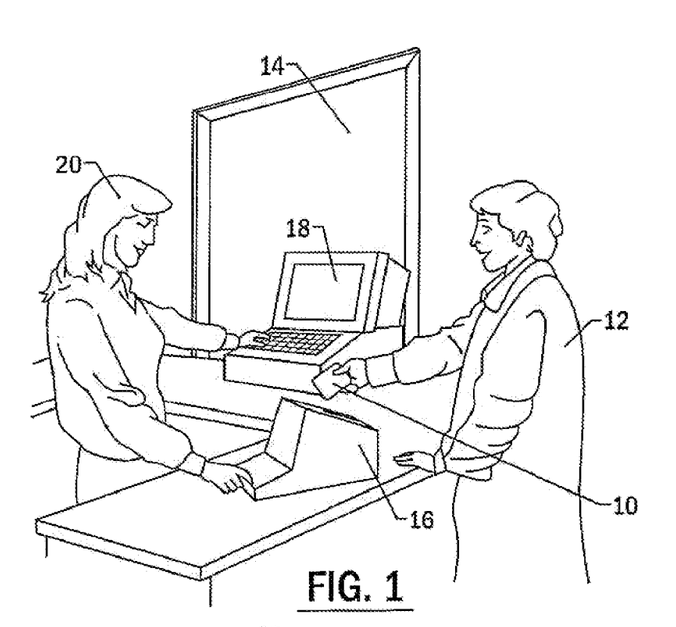
FIG. 1 is an illustrative view of an application of a security system according to one embodiment of the present, invention.

The present invention relates generally to a security system that is capable of verifying the identity of individuals desiring access to restricted information, locations, or other tangible or intangible items. One embodiment of a security system of the present invention is shown in FIG. 1, but many other embodiments and applications of the security system may be created, many of which are explained in detail herein below. For example, an individual 12 may desire to enter door 14. The individual 12 may present a security clearance card 10, which may be read by the card reader 16. The card reader 16 is also capable of receiving biometric data from the individual 12, and comparing that biometric data with the biometric data stored on the card, which is associated with the owner of the card. Via a monitor 18, an operator of the card reader may then view the results of the biometric comparison and the portion of the data stored on the card that the operator is authorized to access. If the biometric of the individual 12 matches the biometric stored on the card 10, and if the data accessed by the operator 20 matches the data necessary to permit a card-owner to enter door 14, then the individual 12 may be permitted to access door 14. On the other hand, if the biometric of the individual 12 does not match the biometric stored on the card 10, and/or if the data accessed by the operator 20 does not match the data necessary to permit a card-owner to enter door 14, then the individual 12 is denied access door 14. Alternatively, the comparison of the scanned biometrics of the card-owner and the biometrics stored on the card can be compared electronically via a computer or specialized processor.

The card 10 may include identity data, field data, and any extra data of interest. The identity data includes any type of data that may be used to verify that the holder of the card is indeed the owner of the card. For instance, identity data may include, but is not limited to the name, address, and date of birth of the owner of the card. The identity data may also include at least one biometric of the owner of the card.

The field data can be any type of more detailed data regarding the owner of the card and/or an item for which the card owner is responsible. For example, the field data may include, but is not limited to, the drivers license number, drivers license restrictions, voter information, and employment information for the owner of the card, and/or a history of the item, information for utilizing the item, or any other type of information regarding the item for which the card owner is responsible. The field data may have multiple levels, and each level may be associated with a different level of security. For instance, basic employment information, such as the name and address of the card owner's employer, may be located in a first level of field data, while the card owner's personnel records may be associated with the basic employment information, but located in one or more higher level(s) of field data, which are more secure than the first level. In addition, the field data may include highly classified data, which has the highest level of security. The highly classified data may include, but is not limited to, the internal controls of the card and the at least one biometric of the owner of the card.

The extra data may be any other type of data that the owner of the card desires to store in the card. For instance, the extra data may be documents, files, charts, or other form of data. The extra data may also be assigned levels of security, if desired.

The data is typically divided into data portions or packets, as known to those skilled in the art. Each data portion may be associated with one of a variety of security levels, and each data portion may be compressed, encoded, and/or encrypted, as discussed herein below. For purposes of simplicity, data portions may be referred to as "data" herein.

The owner of the card is the individual whose identity data is stored in the card. The field data and/or extra data stored in the card 10 may be associated with the owner of the card. Alternatively, the field data and/or extra data man be associated with something, tangible or intangible, for which the owner of the card is responsible. For instance, the field and/or extra data stored on a card may be associated with a ship, container, an organization, an idea, electronic media, or other type of object, tangible or intangible, and the owner of the card may be any person responsible for the object. In addition, in some embodiments of the card for verifying the identity of an owner of the card 10, there may be more than one owner of the card 10. In this instance, there is identity data stored in the card associated with each owner.

As briefly described above, the identity data stored in the card 10 may take any form and be any selected data used to identify the owner or owners of the card. For example, biometric data concerning the card owner may be stored in the card. The biometric data may be any type of biometric identifier known to those skilled in the art. For example, the biometric identifier may be one or more of fingerprints retina scans, voice samples, DNA samples, a combination of two or more of these, or any other type of biometric. The biometric data may be stored in the card in a location that may be easily accessed anytime the card is presented for verification of the identity of the owner of the card, such that the stored biometric may be compared to the biometric of the person presenting the card, as described more fully herein below. In addition, the biometric data may be stored in a highly classified portion of the card to which access is strictly limited, such that the integrity of the biometric data is preserved. In addition, the easily accessible biometric data may be compared to the highly classified biometric data to ensure that the accuracy of the easily accessible biometric data has not been compromised.

If the biometric of the person presenting the card 10 (also called the "holder of the card") matches a biometric identifier stored in the card 10, then the person presenting the card may be permitted to perform an action, granted access to a place or a thing, able to utilize any of the data stored in the card, and/or any other type of function that is permitted by the data stored in the card. If the biometric of the person presenting the card does not match the biometric identifier stored in the card, however, then the person presenting the card may be denied any type of function that would otherwise be permitted to the owner of the card.

Figure 2:
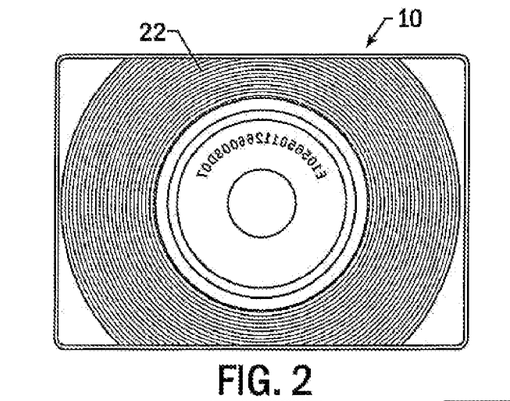
FIG. 2 is a planar view of a CD-ROM portion of a security clearance card according to one embodiment of the present invention.
Figure 3:
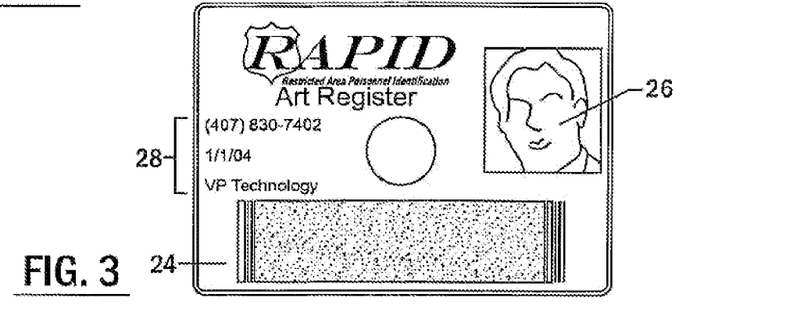
FIG. 3 is a planar view of a data storage medium located on a surface of a security clearance card according to one embodiment of the present invention.

FIGS. 2 and 3 illustrate a security clearance card 10 (hereinafter "card") according to one embodiment of the present invention. The card of this embodiment includes several features for verifying the identity of an owner of the card. For example, the card 10 is formed from a CD-ROM 22. The CD-ROM may include not only general field data and identity data, but it also may include extra data. As FIG. 3 shows, the card 10 may also include a data storage medium 24 located on a face of the card. The data storage medium 24 may include both general field data and identity data.

The CD-ROM 22 may be any type of CD storage element known to those skilled in the art. Typically, the CD-ROM 22 is in the shape of the card 10, with the center of the CD-ROM 22 at the center of the card 10. As such, the card 10 may be placed in a CD-ROM reader, where the CD-ROM portion of the card may be read, as described in detail herein below. In a preferred embodiment of the present invention, data that is stored in the CD-ROM may only be read by those accessing the CD-ROM, the data cannot be removed, changed or modified. The data written to the CD-ROM is permanently stored in the CD-ROM. As such, new data may be written to the CD-ROM, but the old data remains in the CD-ROM also. This type of CD-ROM is typically referred to as a CDR. A CDR is advantageous in the security clearance card 10 of the present invention because it ensures that a permanent record of all of the data stored in the card is kept for future reference. CDR is sometimes referred to a "write once/read many. In addition, the CD_ROM may also include an audit trail containing the location and identity of the operator who stored the original data, as well as any operator who stored subsequent data in the CD-ROM. As such, if there is ever a question about the data stored in a card, then the origins of the data and the circumstances under which the data was written can easily be obtained from the card. This type of data storage is therefore much more secure and tamperproof than the prior art techniques for storing data, such as the microprocessor based smart card that do not provide capabilities to prevent tampering with the data stored in the card.

It must be understood that other data writing procedures may be used. In other embodiments of the present invention, such as those embodiments that do not warrant such tight security for the data stored in the cards, a CD-ROM that permits written data to be deleted, changed or modified, in addition to being read, may be used. This type of CD-ROM is typically referred to as a CDRW.

With regard to FIG. 2, the data storage medium 24 may be located anywhere on the card, so long as it does not obstruct the CD-ROM portion of the card. For instance, the data storage medium 24 is typically printed in an encoded format on at least one side of the card, as shown in FIG. 3. For purposes of this application, encoded data refers to a general electronic data format for storage on the card 10. Accordingly, encoded is not equivalent to encrypted, which is defined as altering the data such that only authorized parties may access it. The data included in the data storage medium 24 is encoded using any technique known to those skilled in the art, such that the data may be utilized by a reader that is capable of decoding the data, as described in further detail herein below. For example, the data storage medium may be encoded in a barcode such as a PDF-417 barcode. Alternatively, the data storage medium may be stored in a hologram, a series of coded dots, a graphic image, magnetic strip, etc. Similar to the CDR discussion above, a barcode or other type of indicia that cannot be changed easily is an advantageous technique for storing data because the data and the circumstances surrounding the creation of the data are permanently stored in the card for future reference.

In addition to biometric data and any other data stored in the card, the CD-ROM 22 and/or data storage medium 24 may contain a digital photograph of the owner of the card. The photograph can be utilized as a further check that the person presenting the card is the owner of the card because, when the card is read by a card reader, as described in detail herein below, an operator may access the picture of the owner of the card and visually compare the picture to the person presenting the card. Alternatively, a card reader may take an image of the person presenting the card, such as with a camera or the like, and then compare that image to the picture of the card owner. Thus, the digital photograph is typically stored in the CD-ROM and/or in the data storage medium portion of the card as identity data, but it may also be stored as part of the field data. In other embodiments of the card 10 of the present invention, an image 26 of the owner of the card may be included on a face of the card 10, as shown in FIG. 3. The image 26 may be in addition to or as an alternative to the image stored in the CD-ROM and/or data storage medium portion of the card 10.

The card 10 also may include any other type of data on the face of the card, such as the name, telephone number, and/or title of the owner of the card, in addition, to the expiration and/or validity date of the card 10, as shown in area 28 of the embodiment of one face of the card illustrated in FIG. 3.

Importantly, as illustrated in FIGS. 2 and 3, the present invention provides a security clearance card in which is stored several different types of identity data for verifying the owner of the card. The owner verification process is further described below, along with various aspects of an overall security system (also called "identity verification system" herein) for creating the cards and for maintaining security and access via the cards.

FIGS. 2 and 3 illustrate the security clearance card of the present invention as a CD-ROM having information printed on a face thereof. It must be understood that this is only one embodiment of the security clearance card. Specifically, the security clearance card of the present invention could be embodied in a standard card having a data storage medium, such as a bar code, printed thereon. In this embodiment, the identity data, field data, and possibly any extra data of interest are encoded into the data storage medium printed oil the face of the card. This embodiment of the card operates very similar to that of the CD-ROM card in the security system, with the CD-ROM having the advantage of more data storage over that of the data storage capability of the data storage medium printed on the face of the card. Alternatively, the security clearance card of the present invention may also be embodied in a smart card. Data storage and appearance would be similar to that of the CD-ROM card. In short, the various aspects of the present invention are not limited to use with a CD-ROM based card, but instead, can be used with many different types of cards having different data storage means.

A first aspect is the gathering and storage of data related to the owner for use in creating the security clearance card. Specifically, to store the desired data in the card, such as the CD-ROM and/or data storage medium portion of the card, an operator of an identity verification system receives, identity data from a prospective owner of the card, and stores that data in a database. Any type of database known to those skilled in the art may be utilized, and the database may be accessed via any appropriate protocol. In one embodiment of the identity verification system of the present invention, the database may be relational and the database ma be accessed via Open Database Connectivity (ODBC) standard protocols. The database may be local to the operator's location, or it may be remote and in communication with the operator's location via a network, conventional or wireless, such as a local area network, wide area network, Intranet and/or the Internet.

Figure 4:
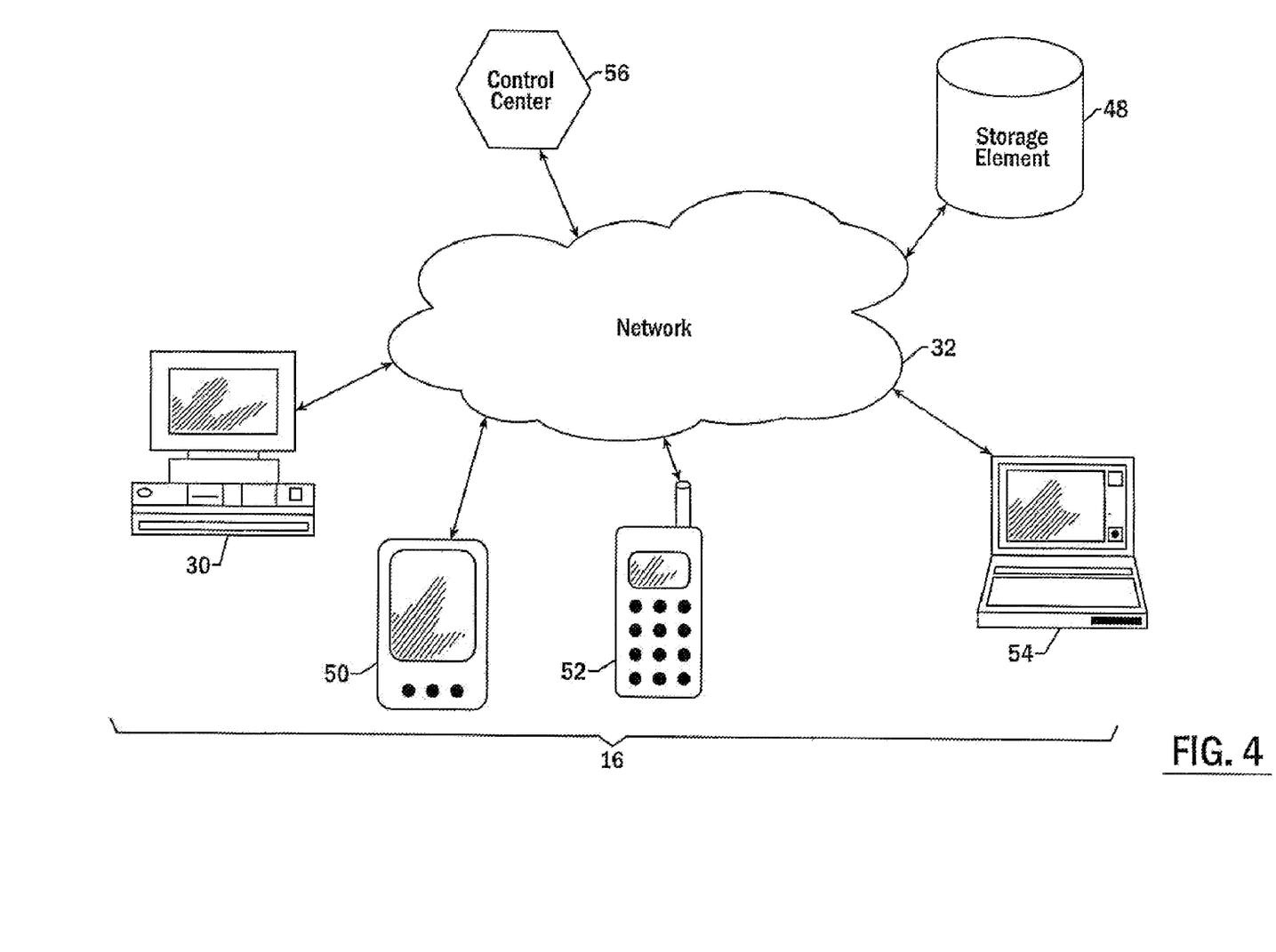
FIG. 4 is a diagram of a plurality of card readers that are capable of communicating with a control center and/or a remote storage element according to one embodiment of the present invention.

FIG. 4 illustrates various embodiments of a card reader 16, one of which is a conventional computer 30, that an operator may utilize to access a database that may be local to the computer 30, or that may be located in a control center 56. The control center 56 may be any type of location where identity verification of potential card owners is carried out, as described further herein below. The control center 56 may also be a location or element where a central repository of identification data associated with all or at least a portion of the card owners and potential card owners is kept. As described further herein below, the data access capabilities of card readers 16 and/or operators of card readers may be controlled and varied as desired via the control center 56.

The data may be obtained from the prospective owner of the card in any manner known to those skilled in the art. For example, the prospective owner of the card may present documentation, such as a birth certificate, proof of address, drivers license, passport, visa, or other official documentation to the operator. Once the operator establishes that the information provided by the prospective owner of the card belongs to that individual by any manner that has been established as acceptable, then the operator may create a record, such as a file, in the database that includes the verified identity data associated with the prospective owner of the card. The record also may include an expiration date associated with the card, such that the card will be invalid after the expiration date, and/or a validity date associated with the card designating some future date when the card will become valid. A permanent or long-term security clearance card having no expiration date or an expiration date that is years away may be generated for owners of cards that store various types of long-term identity and field data. For examples, in certain embodiments of the security clearance card of the present invention, drivers license information, voter registration information, employment information, and other types of long-term information may be included in the field data carried by the card. Thus, once all of the in formation to be included in the card is verified, a permanent or long-term card may be issued to the owner of the card. Alternatively, for short-term applications, such as for short-term visitors to office buildings, short-term visitors to a country and/or during the time information is being verified for a permanent or long-term card, a temporary security clearance card may be issued, which may include only the identity and/or field data necessary for the short-term application of the card.

To create a record in the database, the operator enters the identity data into the database via an interface, which may be any type of computer 30, processing element and/or data entry element that is in communication with the database and/or a network 32 or the like that is in communication with the database, such as a database in located in the control center 56, as shown in FIG. 4. For example, in one embodiment of the identity verification system of the present inventions the operator interface may be a computer utilizing, any modern operating system, such as a Microsoft Windows or Unix operating systems. Other information may also be included in the record depending upon the future application of the card, the requirements of the particular identity verification system, or any other reason. If the operator cannot establish that the information provided by the prospective owner of the card belongs to that individual, then the individual may be denied a security clearance card, issued a temporary card that is valid only until the verification can be performed, and/or further information may be requested of the individual.

The prospective owner of the card also submits at least one biometric for storage in the database record. For instance, in one embodiment of the identity verification system of the present invention, the prospective owner of the card may submit at least one fingerprint via a fingerprint scanner that is in communication with the operator's interface to the database. The fingerprint scanner may be any type of scanner known to those skilled in the art. In one embodiment of the identity verification system of the present invention, the fingerprint scanner is a SecureTouch PC scanner, commercially available from Biometric Access Corporation (BAC). The biometric(s), such as images of the individual's fingerprints, then may be transmitted to the operator's interface from the scanner. The biometric(s) may be analyzed and/or prepared for storage in any manner known to those skilled in the art via the operator's interface. For instance, if the biometrics are images of fingerprints, feature templates may be extracted from the images utilizing BAC software or any other type of software known to those skilled in the art. The feature templates eliminate the extraneous data from the image to facilitate the comparison of the biometric images.

Biometrics other than or in addition to fingerprints may be used. For example, retinal or facial scans, DNA or voice samples, heartbeats characteristics, etc. of the owner of the card may be taken and stored. These various biometrics may then be used either independently or in combination to verify the owner of the security clearance card.

One or more images of the prospective owner of the card may also be captured for inclusion in the database record. The image(s) may be digital or any other type of photograph. If an image is digital, it nay be directly transmitted to the operator's interface and tie database. If an image is not digital, however, it may be scanned into a digital format, as known to those skilled in the art, or otherwise transformed into a format that is capable of being transmitted to the operator's interface and the database. To capture the prospective card owner's image, the operator's interface may be in communication with any type of image capture device known to those skilled in the art.

In one embodiment of the identity verification system of the present invention, the prospective card owner's image may be captured with any TWAIN compliant image capture device. TWAIN is computer hardware and software both for defining a standard protocol and Application Programming Interface (API) for communication between software application and image application devices, and is commercially available from the Twain working Group. Once an image of the prospective card owner is captured, the image may be transmitted to the operator's interface via TWAIN or any other technique known to those skilled in the art. The image may then be analyzed and/or prepared for storage in the card in any manner known to those skilled in the art via the operator's, interface. For example the operator may crop the image or otherwise prepare the image to be stored in the database and/or the card.

In addition, the biometric(s), image(s) and/or others identity data captured from the individual may be prepared in a format that is compatible with existing law enforcement databases of stored biometrics, images and other identity data. As such, the captured biometrics, images, and/or other identity data may be compared to the appropriate law enforcement database(s) to obtain law enforcement information regarding the individual if any. Furthermore, the biometric(s), image(s) and/or other identity data captured from the individual may be transmitted to the appropriate law enforcement databases to add to or update the law enforcement databases, if desired. In these embodiments of the identity verification system of the present invention, the operator interface and/or the database is in communication with the law, enforcement databases via a network, conventional or wireless, such as a wide area network.

For example, in one embodiment of the identity verification system of the present invention, the operator interface and/or the database is in communication with the Automatic Fingerprint Identification Systems (AFIS) belonging to various State and/or Federal law enforcement agencies. As such, when one or more fingerprints are obtained from an individual attempting to obtain a security clearance card, the fingerprints may be transmitted to the AFIS for comparison with the fingerprints on record. This procedure also permits another technique for verifying the identity of a prospective card owner by matching the transmitted biometric(s) and/or image(s) to existing biometrics and/or images in the law enforcement databases, and determining whether the individual associated with any matching existing biometric and/or image is the same as the individual submitting biometric(s) and/or image(s) to the operator.

Another important aspect of the security clearance card of the present invention is the ability to store the data related to the identity of the card owner on the card itself. Specifically, once the operator has entered the record into the database, or while the operator is entering the record into the database, all or at least a portion of the data contained in the record may be stored in the card, such as the storage medium in the card, (e.g., CD-ROM, smart card memory, etc.), and/or the data storage medium portion of the security clearance card 10.

Importantly, in some embodiments, to make the card a self-contained system, at least the portion of the record that includes the biometric may be stored in or on the card. This allows the security system to verify the owner of the card without having to retrieve data from a network database.

In addition to receiving, verifying and storing identity data, as described above, the operator may also receive, verify and store field data and extra data into the security clearance card. As mentioned above, the field data may include any type of information that various applications of the card may require. In addition, the field data may be separated based upon the level of security that is assigned to each type of data included in the field data. The various embodiments of the security clearance cards of the present invention may include various combinations of types of field data. For example, the field data associated with an individual may include driver's license information, voter registration information, employment information, bank account information, and any other type of information desired. In other embodiments of the security clearance cards 10 of the present invention, the field data may be associated with an object (tangible or intangible). For instance, if the field data is associated with a vehicle, the field data may include information regarding what and/or whom the vehicle is carrying, the history of the travels of the vehicle, and any other information associated with the vehicle or its operations.

Each of the types of field data may be assigned various levels of security, and the data within each type of field data also may have various levels of security assigned to it. As explained further herein below, due to the levels of security that are assigned to each type of field data and within each type of field data, each person that is capable of reading, the card will only be able to access the data that is directly applicable for the particular application. For example, a lower level of data may include the card owner's name and possibly a digital picture of the owner. Higher level security data may include the owner's personal information such as address, account numbers, etc. Still further higher level security data may include more sensitive information. A limitation of conventional systems is that all of this data is typically accessible by anyone who scans the card regardless of the sensitivity of the data. The present invention, however, alleviates this problem by ensuring that a particular card reader and/or operator of a card reader may only read a certain level or levels of data, as described in detail herein below.

Not only are the identity, field and/or other data stored in the card 10, but also the circumstances of the card creation and data storage are also stored in the card (referred to herein as "creation data"). For example, when an operator stores the data in the card, the operator's identity information may be stored in the card. The identity of the equipment used to store the card owner's data in the card and to produce the card may also be stored in the card. Furthermore, the identity of any server or database from which any of the card owner's data was obtained, processed or stored may be stored in the card. The creation date and any other type of information regarding the creation of the card and storage of the data in the card can also be included in the data stored in the card. Thus, all of the information needed to trace the creation of the card and the storage of data on the card may be stored directly in the card, such that it is immediately accessible if any issues regarding the card arise. Having all of the data, including the creation data, stored directly on the card, without having to access a separate database for any of the data, greatly increases the speed and security of the security system of the present invention as compared to conventional security systems that depend upon separate databases for much of the data utilized by the system.

In addition, because the security clearance card 10 of the present invention may include not only a CD-ROM portion 22, but also an data storage medium portion 24, as described above, access to certain data may further be restricted based upon the location of the data, the type of card reader, and/or the identity of an operator of the card reader. For example, in one embodiment of the present invention, a lower security level of data may be located in the data storage medium portion 24 printed on the front of the card, while higher level security data may be located in the CD-ROM portion 22. A particular card reader may include only a reader for the data storage medium, such as a bar code reader, magnetic strip reader or the like, such that the only data the card reader may access is the data stored in the data storage medium located on the face of the card. Furthermore, in the example described above, a particular operator may be authorized to access only the lower security level of data, and as such, the operator may be capable of operating a reader for the data storage medium portion of the card only. Thus, including different types of storage medium in the card provides a further security feature for the cards that conventional security clearance cards do not posses.

Furthermore, the security clearance card 10 of the present invention is capable of carrying large amounts of various types of data, and all of the information required for identity verification and any other applicable data is contained in the security clearance card of the present invention. No need exists to access a centralized database for the biometric data with which to compare the biometric of the person presenting the card, or any other data that a reader of the card may require. As such, the card, in conjunction with a card reader, as described in detail herein below, is a lower cost, more efficient, and more reliable technique for verifying the identity of the owners of security clearance cards, than conventional techniques.

In addition to providing a security clearance card having various features for verifying the identity of the card owner, the security verification system provides various features used to ensure the security of the data stored in the card. Each of these features are discussed below under separate headings.

A. Compression

The data, including the biometric data and, optionally, the photo, stored, in the card, such as in the CD-ROM 22 and/or the data storage medium 24, may be compressed in any manner known to those skilled in the art. For instance, the data may be digitally compressed with syntactic compression, a dictionary-based compression, such as TextComp compression, commercially available by Digital Data Research Company, and/or any type of arithmetic compression. By utilizing a compression scheme to compress the data stored in the card, the maximum amount of data may be carried by the card.

As described above, the data stored in the card 10 is typically stored in portions or packets, to further facilitate compression of the data stored in the card. The data portions may be arranged in any manner known to those skilled in the art. For example, the data portions may be arranged in fixed field locations, which provide efficient storage and processing aspects, but create difficulty when changes to the data portions occur. In other embodiments of the present invention, the data may be arranged by the inclusion of linguistic artifacts, such as field identifiers, end of record marks, and/or syntactic and semantic artifacts. This technique is desirable because it provides flexibility in modifications to the data portions. Any other appropriate arrangement technique may be utilized, depending upon the requirements of the particular application of the card 10.

B. Encryption

The data, including the biometric data and, optionally, the photo, stored in the card 10, such as the CD-ROM 22 and/or the data storage medium 24, may be encrypted in any manner known to those skilled in the art. In one embodiment of the card 10 of the present invention, the data may be compressed, as described above, prior to encryption. In alternative embodiments of the card of the present invention, the data may be encrypted without being compressed.

Any type of encryption technique known to those skilled in the art may be utilized to encrypt the data stored in the card. For example, any type of encryption algorithm may be used to encrypt the data, and the encryption may include a key. If the encryption includes a key, the key contents and size may periodically change. Thus, various types of encryption techniques may be created depending upon the number and type of encryption algorithm utilized, whether a key is utilized with the algorithm, and, if so, the content and size of the key. The encryption algorithm may be dynamically generated block cipher encryption algorithms.

The encryption technique(s) utilized for a single card or a set of cards may be referred to as the encryption cocktail. Thus, various types of encryption cocktails may be created, such that each card or each set of cards has a different encryption cocktail. The different encryption cocktails are therefore unique encryption structures particular to the card or set or sets of cards. For example, a card or set of cards utilized to access one company's building will utilize a different encryption cocktail than the card or set of cards utilized to access another company's building. This type of encryption assignment creates a very secure environment because even if the encryption structure for one card or set of cards is determined, the security of other cards or sets of cards is maintained, which is unlike the prior art security systems, particularly those that utilize microprocessor cards.

In addition, more than one type of encryption technique may be utilized to encrypt different portions of the data stored on the card. Thus, a different encryption technique may be assigned to the various types of data stored in the card, depending, for instance, upon the level of security that is assigned to the data and/or upon the sensitivity of the data. For example, each of the various levels of security that are assigned to the identity, field data, and/or extra data that is stored in the card, as described hereinabove, may be assigned a different encryption technique. This configuration, in conjunction with the assignment of the capability to read only a certain type of encryption or encryptions to potential readers of the data stored in the card ensures that the person reading the card is permitted to read and/or access only the portions of the data stored in the card that are appropriate for the application associated with the reader.

As mentioned previously, a security clearance card may include various levels of data. For example, a lower level of data may include the card owner's name and possibly a digital picture of the owner. Higher level security data may include the owner's personal information such as address, account numbers, etc. Still further higher level security data may include more sensitive information. A limitation of conventional systems is that all of this data is typically accessible by anyone who scans the card, regardless of the sensitivity of the data. The present invention, however, alleviates this problem. Specifically, the system of the present invention categorizes data concerning the owner of the card into different security levels, and permits access to the data only by the operators of card readers that have the authority to access the particular security level associated with the data.

Figure 5:
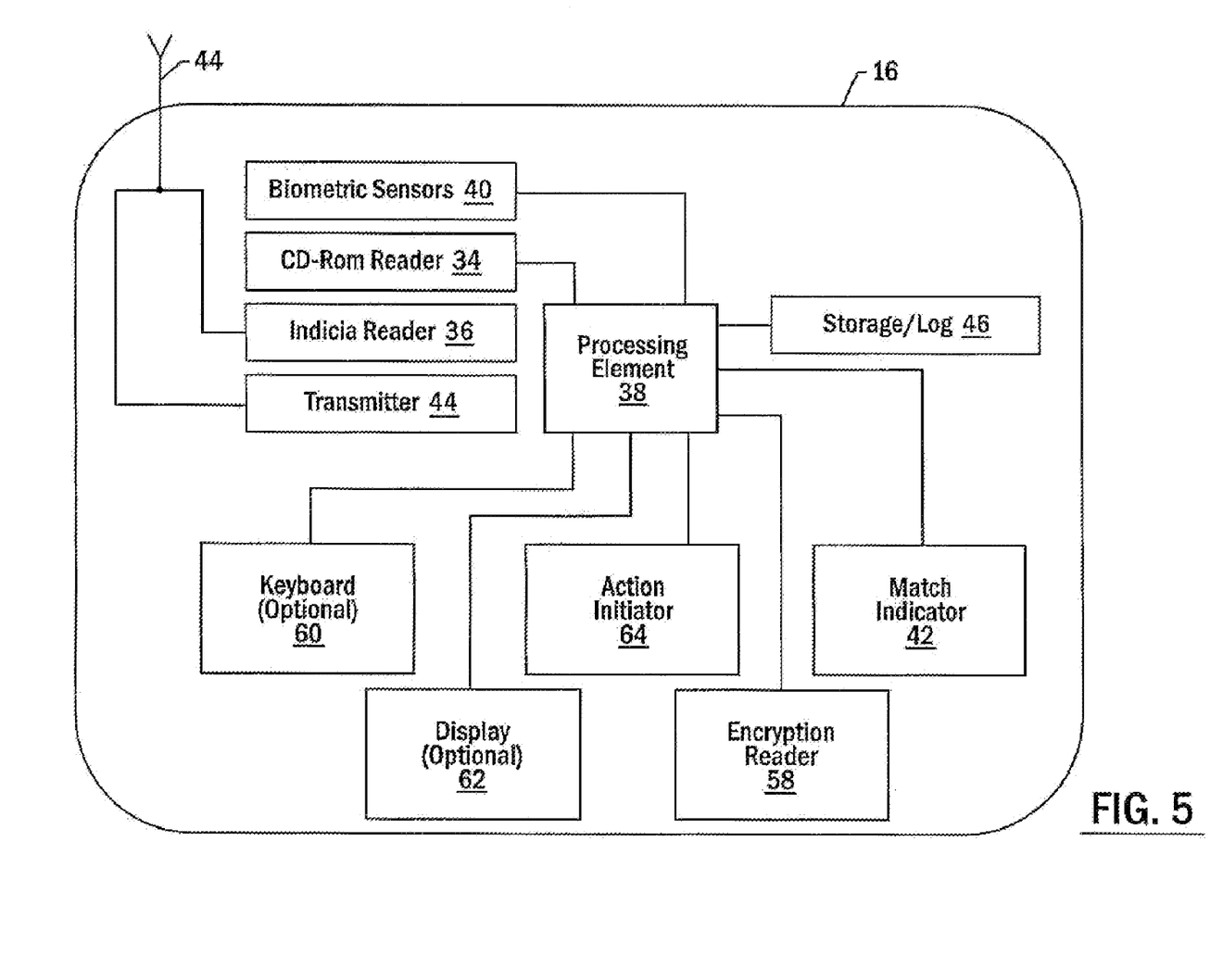
FIG. 5 is a diagram illustrating the functions of a card reader according to one embodiment of the present invention.

For example, certain card readers and operators or groups of operators of the card readers may access only certain portions of the data stored in the card. The card readers may be capable of decrypting only a certain type or certain types of encryption(s), which limits the card reader's accessibility to the data encrypted with other types of encryption. Furthermore, each operator or group of operators may be associated with the capability to read only the type of encryption for the data that each operator or group of operators is permitted to access. Regardless of whether the card reader and/or the operator is authorized to read a certain type of encryption, the encrypted data may be read via an encryption reader 58, as shown in FIG. 5.

The identity data, field data, and/or extra data stored in the card may be encrypted with various encryption techniques depending upon the level of security assigned to the particular type of data. For instances, in the example described in FIG. 1, the operator 20 may be associated with the capability to read only the encryption of the first level of data, such as a portion of the identity data stored in the card, while the operator's manager(s) may be associated with the capability to read not only the encryption of the first level of data, but also the encryption(s) of at least a portions of the data assigned a higher level of security, which may aide the manager(s) in assessing the risk presented to the organization by an owner of a card. In other embodiments of the security system of the present invention, the basic identity data, such as the name, address and biometric, of the owner of the card, may be unencrypted, while all of the other identity, field and/or extra data is encrypted. Thus, some card readers and/or operators may not be associated with the capability to read any type of encryption, such that only the basic identity data may be accessed without the possibility of accessing any encrypted data.

Furthermore, the encryption technique(s) may be linked to the biometric of the owner of the card. As such, the data carried by the card may only be unencrypted by a reader, as explained in detail herein below, if the biometric of the person presenting the card matches the biometric of the owner of the card that is stored in at least the CD-ROM portion of the card 22. In addition, by linking the encryption techniques(s) for the data stored in the card to the biometric of the owner of the card, each encryption technique used for each card is different which adds to the security of the data carried by the card.

In further embodiments of the present invention, the encryption technique(s) may be linked to the creation data stored in the card. Thus, the encryption of the data stored in each card is different based upon the different circumstances of creation associated with each card.

The various encryption techniques described above provide a very secure environment for storing the sensitive security card data. In addition, even if the encryption cocktail for one card is discovered in an unauthorized manner, only one card is jeopardized. Conventional security clearance cards, in which all of the cards have the same security structure in the card or in a database, such as microprocessor cards, smart cards, and the like, have a much different situation, because if the security structure for the cards and/or the database is discovered, then the security of all or a large portion of the cards has been jeopardized.

Because each card may potentially utilize different arrangements of the data (as described under the "Compression" heading) and different data encryption techniques, the data arrangement and encryption utilized in each card must be communicated to the card readers in some manner so that the card readers are able to find and read the appropriate positions of data stored in the card. In one embodiment of the security system of the present invention, a database and/or tabular method may be used to record the arrangement, encryption and any other information associated with the data portions. The database and/or table may be stored in the card 10. In addition, each data portion stored in a card may be assigned an ID number that may be used to look up the information regarding the data portion in the database and/or table.

When a card reader scans a data portion stored in the card, the ID number is extracted from the data portion. The card reader then accesses the database and/or table, and utilizes the ID number to look up the information regarding the arrangement of the data portion, the encryption of the data portion, and any other information regarding the data portion. If the card reader and/or the operator logged on to the card reader are authorized to decrypt the type of encryption assigned to the data portion, then the card reader may read the data portion. Regardless of whether the card reader reads the data portion, it then may transmit the data portion to another downstream application, as described herein below.

C. Card Readers

The security verification system of the present invention may further include card readers 16 capable of reading a security clearance card 10 according to the present invention in order to verify the identity of the owner of the card and, in certain cases, access at least a portion of the identity data, field data, and/or extra data stored in the card. A diagram of one embodiment of a card reader 16 that illustrates some of the functionality of the card reader is shown in FIG. 5. The card reader may include a CD-ROM reader 34 that is capable of reading at least portions of the data stored in the CD-ROM of the card 22. In particular, the CD-ROM reader 34 is capable of reading biometric data of the owner of the card that is stored in the CD-ROM portion of the card 22. In addition, the card reader 16 may include a reader 36 that is capable of reading at least some of an data storage medium portion of the card 24. Thus, the reader 36 is capable of decoding at least a portion of the coded data stored in the data storage medium. For example, if the data storage medium appearing on the card is a bar code, then the card reader 16 of the present invention will include a bar code scanner as the reader.

The card reader 16 of the present invention may further include at least one biometric sensor 40 for accessing a biometric of a holder of a card. The nature of the biometric sensors is dependent upon the type(s) of biometric that have been selected for scanning. For example, one or more of the biometric sensor(s) may be a finger print scanner, a retinal scanner, a voice recognition device, etc.

The card readers 16 also include a processing element 38, that receives the data from the CD-ROM reader 34, the reader 36, biometric sensors 40, and/or any other element that is capable of receiving data from the card 10 and/or the individual presenting the card. The processing element 38 is capable of comparing the biometric of the owner of the card, which is stored in the card, with the biometric of the individual presenting the card, which is received by the card reader via the appropriate type of biometric sensor 40. If the comparison results in a difference between the two biometrics that is within a given tolerance, then the individual presenting the card is deemed to be the owner of the card by the security system. The tolerance level may be set at any desired value. For instance the tolerance level may be set to a value that prevents any results except perfect matches from indicating the individual presenting the card is deemed to be the owner of the card. Alternatively, the tolerance level may be set to a value that allows a certain amount of error between the two biometrics.

If the individual presenting the card 10 is deemed to be the owner of the card, then the match indicator 42 may transmit a match indication, via a transmitter 44, to the appropriate indicator located on the outside of the card reader 16. For instance, the indicator may be a light emitting diode (LED) that lights up a particular color to indicate a match, or it may be an indication in a display.

The card readers 16 are also capable of maintaining a log of all access attempts, successful and unsuccessful, by recording the biometric presented by the individual attempting to gain access. The storage element or log 46 may be stored in a database that is local to the card reader, and may be periodically downloaded to a permanent or temporary storage element, or it may be purged, depending upon the particular application of the card reader. Thus, the card readers may be stand-alone or may be in communication with at least one remote storage element 48, such as a database, via any type of network 32, conventional or wireless, such as a local area network, a wide area network, an intranet, and/or the Internet, as illustrated in FIG. 4. In other embodiments of the present invention, the card readers may not be capable of storing a log of access attempts locally, even temporarily, but may be in communication with a remote storage element 48, such as a database, via a network as described above. As such, access attempt data may be directly transmitted to the remote storage element 48 at the time of attempt. The log data 46, which includes the submitted biometrics, may be analyzed to identify any individuals who are attempting to utilize a security clearance card that does not belong to them. Appropriate action may then be taken against those individuals, if necessary.

The card readers 16 may be manned or un-manned, depending upon the location of the card reader. For example, embodiments of the card reader may be conventional computers or other types of devices, as illustrated by devices 30, 50, 52, and 54 of FIG. 4. The devices may be stationary or mobile, depending upon the particular application of the card reader 16.

For a manned card reader 16, an operator of the card reader may be required to log on to the card reader, which records the identity of the operator. To log on, the potential operators of the card reader may be required to submit at least one biometric, which may be matched to potential operator biometrics that are stored in and/or accessible by the card reader. For instance, potential operator biometrics may be stored in a storage element 48 that is separate from the card reader, but that is in communication with the card reader. In other embodiments of the card reader 16, potential operator biometrics may be stored in a storage element contained in the card readers such that the card reader 16 is a stand-alone device without the need to access any type of remote element. Each time the operator logs onto the card reader, the operator may be required to submit at least one biometric that may be compared against biometrics stored in and/or accessible by the card reader. If the biometric submitted by the operator matches a biometric stored in and/or accessible by the card reader, the operator may be permitted to operate the card reader. If the biometric submitted by the operator does not match a biometric stored in and/or accessible by the card reader, the operator may be denied access to the card reader, requested to submit another biometric, and/or any other function based upon the particular application and/or location of the card reader. Here again, the card reader may store a log of the biometrics scanned by attempted users of the system for later analysis and determination of those who may be attempting break into the system.

As mentioned previously, a security clearance card may include various security levels of data. For example, a lower level of data may include the card owner's name and possibly a digital picture of the owner. Higher level security data may include the owner's personal information such as address, account numbers, etc. Still further higher level security data may include more sensitive information. A limitation of conventional systems is that all of this data is typically accessible by anyone who scans the card regardless of the sensitivity of the data. The present invention, however, alleviates this problem. Specifically, the system of the present invention categorizes information concerning the owner of the card into different security levels, and permits access to the information only by card readers and/or the operators of card readers that have the authority to access the particular security level associated with the information.

Thus, in addition to storing the biometric(s) of the potential operators of the card readers, other data associated with the potential operators or groups of operators of the card readers may also be stored locally in the card reader or in a remote storage element with which the card reader is in communication via any type of network 32 or the like. For example, in an embodiment of the present invention, information regarding the level of access to the data stored on the card, i.e. the identity data, the field data, and/or the extra data as described hereinabove, that is assigned to each potential operator or groups of operators of a particular card reader may also he stored where it may be accessed by the card reader. Thus, depending upon the identity and/or type of the operator logged onto the card reader, and based upon the level of access assigned to the operator, the card reader may read only certain portions of the data carried by the card.

For example, in an embodiment of the identity verification system of the present invention that is located in an airport, one operator or group of operators of a card reader, such as a guard or guards, at the airport entrance may be permitted a level of access that allows the operator to view only a potion of the identity data, i.e., biometric, name, address, date of birth, and/or validity and expiration dates, from the data stored in a card As such, the guard(s) can only view the results of the biometric comparison, as described hereinabove, and view at least a portion of the other identity data regarding the owner of the card. In this embodiment, another potential operator or group of operators of the card reader, such as an airport manager or managers, may be permitted a level of access that allows the manager(s) to view other portions of the identity data, field data, and/or extra data stored in the card. For example, in embodiments of the identity verification system of the present invention, the identity data may be compared to a list of identity data for individuals that have been identified as presenting possible threats to airport/aircraft safety. If the individual presenting the card matches the list, then an airport manager may log onto the card reader, which will recognize the airport manager's biometric(s) as permitting access to further data stored in a card, and permit the airport manager to access the portions of the data that may aide the airport manager in assessing the risk presented to the airport/aircraft by the particular individual.

In one embodiment of the identity verification system of the present invention certain operators or groups of operators of the card readers may access only certain portions of the data stored in the card by associating each operator or group of operators with the capability to read only the type of encryption for the data that each operator or group of operators is permitted to access, via an encryption reader 58, as shown in FIG. 5. As described hereinabove, the identity data, field data and/or extra data stored in the card may be encrypted with various encryption techniques depending upon the level of security assigned to the particular type of data, For instance, in them example described above, the guard(s) may be associated with the capability to read only the encryption of the identity data or a portion of the identity data carried by the card, while the airport manager(s) may be associated with the capability to read not only the encryption of part or all of the identity data carried by the card, but also the encryption(s) of at least the portions of the field data and/or extra data stored in the card that may aide the airport manager(s) in assessing the risk presented to the airport/aircraft by an owner of a card.

In further embodiments of the identity verification system of the present invention, certain operators of card readers may have the capability to modify, such as change, add to, and/or delete, the data stored in the security clearance card 10. For example, the card 10 may include a CD-ROM 22, such as a CDRW, for storing the identity, field and/or extra data, and an operator may be able to not only read the data stored in the CD-ROM, but also modify the data by changing, deleting and/or adding to the data. In other embodiments of the present invention, the card may include a CD-ROM 22, such as a CDR, for storing identity, field and/or extra data, and an operator may be able to read the data only. If the operator is allowed to make modifications to the data stored in the CDR, the only modifications involve adding to the data stored in the card without changing or deleting any of the existing data stored in the card. It must be understood that other data writing procedures may be used.

In other embodiments of the present invention, such as those embodiments that do not warrant such tight security for the data stored in the cards, a CD-ROM that permits written data to be deleted, changed or modified, in addition to being read, may be used. This type of CD-ROM is typically referred to as a CDRW.

The card readers 16 that such operators utilize, therefore, also have data entry means, such as a keyboard 60 or other type of receptacle for receiving information, and the capability to store the modified data in the appropriate portion of the card, such as via a transmitter 44. The capability to make modifications to the data stored in a card may be associated with the particular operator's biometric, such that when the operator logs onto a card reader, the operator submits at least one biometric that is latched against the stored biometrics of the potential operators, as described hereinabove, and the card reader recognizes that the operator has the ability to make modifications to the data stored in the card. In one embodiment of the identity verification system of the present invention, the operator is not allowed to make changes to his or her own security clearance card, such that any changes that are made to a security clearance card must be verified by a third person prior to being stored in the card. Furthermore, in embodiments of the identity verification system of the present invention, all of the modifications made to the data stored in the card may be tracked, such that the exact modification made and the operator who made the modification are identified and stored in the card and/or in a remote storage element, in case the details of the modification are needed at a later date. As described above regarding cards in which data is stored in a CDR, in order to further track the changes to the data stored in the card, the modifications may not completely overwrite the previous data stored in the card, such that the modifications create an additional layer of data over the previous data, and do not delete any of the previous data. As such, the previous data may be accessed at a later time, in case a need for the previous data arises.

As a further security procedure, the card readers may also be capable of checking the security clearance cards to verify the integrity of the cards prior to permitting an individual access to a location or object, and prior to relying upon the data stored in the card in various applications. As such, the card may contain highly secured internal controls that may be verified by the card reader. Furthermore, the card reader may be capable of checking the modification data to ensure that modifications of the data stored in the card have been done according to the procedures described above. If any discrepancy exists in the data or internal controls of the card, then the card reader may deny the individual access to the desired location and, for the manned card readers, display the discrepancy to the operator. Far instance, if the card reader detects a discrepancy in the data or internal controls of the card, the card reader may display particular colors and/or symbols to represent the location and/or nature of the discrepancy. Such a discrepancy may also trigger the card reader, manned or unmanned, to initiate one or more action, as described more fully herein below.

Typically, the unmanned card readers are capable of reading only at least a portion of the identity data from the data stored in the card, such that the unmanned card readers may permit or deny access to a location or object (tangible or intangible), based upon the comparison between the biometric stored in the card and the biometric received by the card reader from the individual presenting the card. In other embodiments of the identity verification system of the present invention, however, manned and/or unmanned card readers may also be capable of reading all of the identity data, at least a portion of the field data, and/or the extra data stored in the card, based upon the particular application of the card reader. In the same way as described above, each cad reader may access only certain portions of the identity, field, and/or extra data stored in the card by associating each card reader with the capability to read only the type of encryption for the data that each card reader is permitted to access.

The type and/or amount of data that a card reader may access may be varied, such that the items a certain card owner can access may be varied. In one embodiment of the security system of the present invention, a central node, such as the control center 56, may be in communication with one or more of the card readers 16 in the security system. Changes to the type of access permitted to a particular cardholder then may be made at the central node, and transmitted to the card readers at issue. For example, cardholder A may initially be permitted to access all items in a particular organization. Due to changes in the items and/or changes to cardholder A's status, card holder A's access permissions may change, such that card holder A is no longer allowed to access door 5 in the organization. The changes to card holder A's permissions may be made at the central node, and the central node transmits the changes to the card reader at issue, which, for this example, is the card reader associated with door 5. The door 5 card reader now will deny card holder A access to door 5. Similarly, the amount and type of data an operator of a card reader may access also may vary. Thus, this security system enables changes to card holder access to be made efficiently, while also ensuring that the access decisions are made at the card reader level, instead of requiring the card reader to query a remote database each time a decision must be made, like conventional security systems.

Therefore, the security clearance cards 10, in conjunction with the card readers 16, of the present invention, not only provide a secure, reliable and efficient technique for determining whether an individual presenting a security clearance card is in fact the owner of the card, but also ensure that the card: reader and/or any person operating a card reader is capable of accessing only the necessary data. As such, the private information associated with the owner of the card remains private, and only those readers and/or people authorized to access the private information are permitted access to it. In addition, changes to the type and/or amount of data that a card reader and/or card reader operator may access may be made via a central node, and transmitted to the card reader(s) at issue, such that changes are made efficiently, but access decisions are continuously made at the card reader level.

Manned and/or unmanned card readers 16 may also include a display 62, such as the monitor 18 shown in FIG. 1, for presenting information to the operator and/or the individual presenting the card. For example, in embodiments of the identity verification system of the present invention that include manned or unmanned card readers 16, operators and/or individuals presenting the card may view a display that at least indicates whether the biometric(s) stored in the card match the biometric(s) submitted by the individual presenting the card. This indication may consist of at least a portion of the display screen turning a particular color based upon the result of the biometric comparison, such as green when the biometrics match, and red when the biometrics do not match. Alternatively to or in addition to the color that may be presented to the operator via the display screen, words, symbols and/or objects may also be presented to the operator to further indicate the results of the biometric comparison. For instance, a "yes," "okay," thumbs-up symbol, or the like may be displayed on the screen when the biometrics match, and a "no," "stop," stop sign symbol, or the like may be displayed on the screen when the biometrics do not match. In other embodiments of the identity verification systems of the present invention that include manned and/or unmanned card readers 16, at least a portion of the identity data, i.e. the biometric name, address, and/or date of birth, of the card owner and/or the validity and expiration dates of the card may be displayed when the card reader reads the identity data. For security/privacy reasons, the unmanned card readers and/or manned card readers 16 may restrict the amount of identity data that is displayed. When the operator logged on to a manned card reader is capable of reading at least a portion of the field and/or extra data carried by the card, then that data may be displayed to the operator via the display 62 also.

Depending upon the result of the biometric comparison, the card reader may initiate certain actions. In one embodiment of the identity verification system of the present invention, manned and/or unmanned card readers 16 may initiate actions, such as audible or silent alarms, via the action initiator 64, when the biometrics do not match and/or when the identity data stored in the card matches identity data associated with individuals that have been identified for some reason. For example, the card readers may be capable of storing or accessing identity data associated with individuals that have been identified, such as due to particular issues associated with the individual or any other reason. The card readers then may compare identity data stored in a card with the identity data stored in card readers either prior to or subsequent to the biometric comparison, but prior to permitting the individual presenting the card to gain access to the desired location or object, and prior to relying on the data stored in the card. The silent or audible alarm, therefore, indicates to the operator of the card reader that the individual presenting the card should be examined further, based upon the application and/or location of the card reader. In other embodiments of the identity verification system of the present invention, other actions may be initiated by the card reader, via the action initiator 64, such as immediately contacting a manager and/or law enforcement officials, i.e. a downstream application, when the biometrics do not match and/or when the identity data stored in the card matches identity data associated with individuals that have been identified for some reason. This type of action may be initiated with or without the alarm action described above and/or any other type of action.

The card reader may also be capable of reading instructions that are stored in the card reader, the individual security clearance cards, and/or any other location the card reader is capable of accessing. The instructions may include the type of actions to initiate based upon the results of a biometric comparison, the identity data analysis, and/or the information submitted by the individual presenting the card. For example, the card reader may read instructions that direct it to initiate different actions based upon the type of biometric that is submitted by the owner of the card. For example, in an embodiment of the identity verification system of the present invention, the card reader may be instructed to perform normal operations, i.e. permit or deny access to the individual presenting the card based upon a biometric comparison, when the individual presenting the card submits a right-hand, index finger fingerprint to the card reader. If, however, the individual presents a fingerprint from a different finger, then the card reader may be instructed to immediately notify a person or organization that can help with the situation, such as a manager and/or law enforcement officials. This functionality of embodiments of the card reader 16 may be advantageous in situations in which the card reader 16 is capable of allowing access to valuable, sensitive information and/or locations. For example, in situations where the card reader 16 allows the owner of a card access to a bank account, the owner of the card may present a right-hand, index finger fingerprint in normal situations, but if the owner of the card is in danger, such as if another person is forcing the owner of the card to access the bank account so that the other person can gain access to it, then the owner of the card may submit a fingerprint from a different finger, which will trigger the card reader to immediately contact law enforcement officials, i.e., a downstream application.

Figure 6:
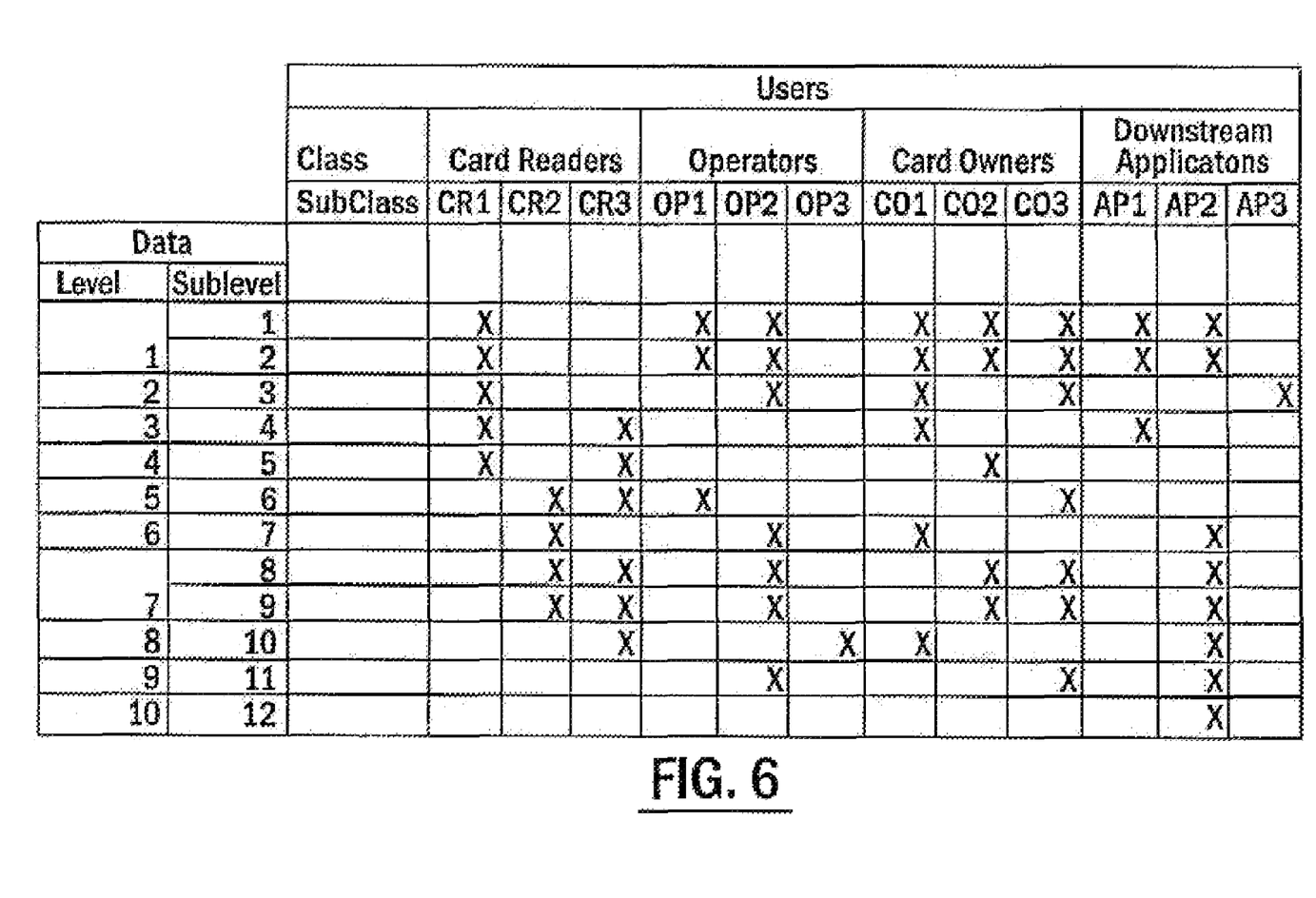
FIG. 6 is a chart illustrating the levels of data stored in a security clearance card, potential classes and subclasses of users of the data, and which subclasses are permitted to access which levels of data, according to one embodiment of the present invention.

As FIG. 6 illustrates, any given security system according to the present invention may be configured such that only certain card readers, certain card reader operators, certain card holders, and/or certain downstream applications may access certain levels and/or sub-levels of data that is stored in the card 10. FIG. 6 illustrates a security system in which each card has at least 10 levels of stored data, and each level may have more than one sublevel, as shown with Levels one and 7, The potential users or subclasses of users of the data stored in the cards of the security system are listed across the top of the chart. For example, there are three subclasses of card readers (CR1, CR2, CR3), three subclasses of operators of the card readers (OP1, OP2, OP3), three subclasses of card owners (CO1, CO2, CO3), and three subclasses of downstream applications, (AP1, AP2, AP3) as potential users of the data stored on the cards of the security system illustrated in FIG. 6. Other embodiments of the security system of the present invention may include a different amount, if any, of levels, sublevels, and/or subclasses of users. In further embodiments, the classes of users may not be divided into subclasses, but, instead, each user may be individually listed.

An "X" in the box directly below a potential subclass of users indicates that the subclass may read the Level and/or Sublevel of data associated with the row in which the X is located. For instance, as shown in FIG. 6, CR1 may read any data stored in Levels 1-4 of a card 10, while OP3 may read data stored only in Level 8. Thus, by storing only certain types of data in certain Levels and/or Sublevels, and by strategically assigning which potential subclass(es) of users may read which Levels and/or Sublevels, the security system of the present invention provides flexibility, efficiency and data protection that conventional security systems do not provide. Furthermore, while the security system of the present invention is capable of functioning without having to access a remote database or storage element of any type, it is also capable of passing along the data stored in a card to other users, such as any downstream applications of the security system, which may be remote. For instance, as shown in FIG. 6, CR1 is not capable of reading the data stored in Level 10 of a card, but CR1 can transmit the data from Level 10 to AP2, where the Level 10 data may be read.

In addition, the security system of the present invention is capable of allowing conditional access to certain levels and/or sublevels of data stored in the card. For example, an operator or a card owner may be designated as an owner of one or more data level and/or sublevel. After the card reader initially scans a card and performs identification verification of the operator and/or the card owner by matching biometrics, as described hereinabove, the card reader may prompt the owner of a level and/or sublevel of data to approve or deny access to the data. In one embodiment of the security system of the present invention, the owner may be prompted to submit another biometric sample to indicate the owner's approval. For instance, in the example shown in FIG. 6, CO3 may be subclass of card owners that have requested that they be able to approve, on a case-by-case basis, whether another user or subclass of users is able to read the card owner's social security number. Assuming that Level 9 contains the card owner's social security number, then prior to permitting an operator in the OP2 subclass and/or a downstream application in the AP2 subclass to access the data in Level 9, the card owner in the CO3 subclass must approve.

The card readers 16 are therefore capable of ensuring that only the appropriate type(s) of data are read, viewed and/or accessed by any potential user of the security system. In addition, the instructions for the card readers, which include a processing element, may be located within the card readers, such that no need exists for the card reader to access a remote device for instructions or data. Furthermore, the card readers are capable of logging the attempts to utilize security clearance cards by storing the biometrics that are submitted to the card reader, such that any fraudulent attempts to use the cards can be easily identified via analysis of the stored biometrics. Thus, the card readers, in conjunction with the security clearance cards of the present invention, provide a secure, flexible, and low cost technique for not only verifying the identity of an individual, but also for ensuring that only authorized persons are capable of viewing and/or accessing a card owner's data.

D. Application Examples

Certain advantageous embodiments of the identity verification system of the present invention are described below. The potential applications of the identity verification system are wide-ranging, and these specific embodiments are provided for illustration purposes only. For example, the identity verification system may be utilized in seaports, airports, registration of foreign nationals (both students and those in the workforce), in government and private buildings, power plants, water plants, and prisons, just to name a few. In the explanation of these embodiments the descriptions of the identity verification system, including the security clearance cards, of the present invention, which are provided above, are incorporated.

An embodiment of the identity verification system of the present invention may be utilized in any application in which employees or other individuals must undergo a background check prior to accessing "restricted areas." In this situation, once a background check has been performed and the proper applicable procedures have been followed, the employee or other individual may be issued a security clearance card in accordance with the present invention. As such, because the security clearance card stores a biometric of the owner of the card, and because the individual presenting the card must provide a matching biometric, prior to gaining access to the restricted area, there is little risk that an individual who has not passed a background check in accordance with the proper procedures can gain access to the restricted areas. This type of application may be utilized for seaports, power plants, water plants, government and private buildings, prisons, and any other location that contain certain areas and/or items that only a select group of people may access.

In other embodiments, individuals, may also be required to check out via the card reader with their security clearance card when they leave the restricted area. In this embodiment, the identity verification systems is capable of tracking the amount of time and/or the number of times a particular individual accesses certain areas. This type of data may be utilized in various other downstream applications, such as accounting applications and/or applications that enforce limits on the amount of time spent in a certain area, such as limits on the amount of time that an individual may be exposed to radiation. In the later example, once an individual has reached the limit, the card reader will no longer allow that individual access to the restricted area, even if the individual's biometrics match the biometrics carried by the card. Once the individual may be exposed to radiation again, the card reader will again allow the individual to access the restricted area. Furthermore, in certain applications, it may be desirable to permit an individual to access a particular area, but not to let them leave the area, at least for a predetermined period of time. Thus, the security system of the present invention is also capable of implementing this application.

In another embodiment of the identity verification system of the present invention, a security clearance card may be associated with an object, either tangible or intangible, instead of an individual. For instance, a security clearance card may be associated with a shipment, such that the card stores data regarding the shipment, such as the contents, origin, destination, owner, and any other data about the shipment. In addition, the card stores identity data for an individual who is responsible for the shipment, such that the individual's biometric(s) are stored in the card and the individual must submit matching biometric(s) in order to vouch for the validity of the shipment.

The identity verification system of the present invention may also be used for voter identification and registration. For example, an individual's voter registration may be stored in the cards and polling locations may have card readers. As such, the election workers may be identified as operators of the card readers with the capability to read only the voter registration portion of the data stored in security clearance cards. Therefore, an individual may present his or her card to an election worker who operates a card reader that compares the biometric(s) stored on the card with at least one biometric submitted by the individual. If the biometrics match, and the individual's voter registration information is verified, then the individual will be permitted to vote at the location. Therefore, the identity verification system of the present invention greatly reduce the risk of voter fraud by ensuring that the person voting is the person that is registered to vote.

Embodiments of the identity verification system of the present invention may also be utilized for the registration and tracking of foreign nationals, both students and those in the work force. In this application, a security clearance card of the present invention may be issued to each foreign national, and the card includes identity data regarding the particular foreign national, including at least one stored biometric. The foreign nationals may be required to report to any appropriate official agency office on some periodic basis so that the government may obtain information regarding the foreign national's status, such as to ensure that the foreign national continues to be enrolled in school and/or working in the country. When a foreign national reports to the appropriate office and presents the card, an official at the office may operate a card reader to read at least a portion of the identity data carried by the card, and to verify that at least one biometric submitted by the individual matches the biometric(s) stored in the card. The official then may determine the status of the foreign national based upon their activities. A log is created of the foreign national's reporting in order to document that the foreign national has complied with his or her obligations. If the foreign national fails to report, or if the status of the foreign national has changed, then the identity verification system of the present invention may automatically report that information to the appropriate officials so that they can take proper action. In this embodiment, the card reader may be in communication with a central control facility and/or a downstream application that manages the foreign national information, such that the card reader can automatically transmit the data regarding the foreign national to the appropriate location.

As conveyed by the variety of examples described above and the overall description hereinabove, the security clearance cards and the identity verification system of the present invention, may be employed in a variety of potential applications. Not only are the security clearance cards, in conjunction with the card readers, capable of verifying the identity of an individual without the need to access a remote database, but the system is also capable ensuring that operators of card readers may view and/or access only the portions of the data carried by the card to which they have authorization. Furthermore, the present invention tracks the usage of the cards by logging the biometrics that are submitted when an individual attempts to utilize the card, such that any fraudulent usage of the card is easily caught, and the responsible person identified. Therefore, the security clearance cards and the identity verification system of the present invention provide an efficient, secure and accurate technique for ensuring that only the appropriate individuals gain access to certain locations, information, objects, and/or any other item of which protection is desired.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A security clearance card for verifying the identity of the holder of the security clearance card comprising:
    a substrate capable of storing data therein; and
    a data storage medium located on a face of said substrate comprising at least two data portions, wherein each data portion is encoded differently, and wherein each data portion has an associated security level accessible when decoded and read using a corresponding reading device, while at least one other data portion is not accessible using that same reading device.

2. A security clearance card according to claim 1, wherein said data storage medium is a bar code containing data for verifying the identity of the holder encoded therein.

3. A security clearance card according to claim 1, wherein said card comprises at least three types of data: identity data, field data, and other data, wherein identity data is data used to verify the owner of said card, field data is data associated with the owner of said card, and other data is data of interest stored on said card and wherein said substrate may include all three types of data stored therein and said data storage medium may include only identity and field data stored therein.

4. A security clearance card according to claim 1 further comprising:
    a plurality of data portions stored in the security clearance card, wherein at least one of said plurality of data portions comprises at least one biometric identifier of the owner of the security clearance card; and
    a plurality of different security levels, wherein each of said plurality of data portions is associated with one of said plurality of different security levels.

5. A security clearance card according to claim 4 further comprising a log containing a record of at least one event related to creation of the security clearance card and modification of data on said security clearance card.

6. A security clearance card according to claim 4 further comprising a validity date corresponding to a date that the card becomes valid for use.

7. A security clearance card according to claim 1, wherein the security clearance card is embodied in a CD-ROM or a smart card.

8. A security clearance card according to claim 1, wherein each data portion is encrypted using a different encryption key, and wherein the associated security level of each data portion is accessible when decoded and read using a corresponding security key, while at least one other data portion is not accessible using that same security key.

9. A security clearance card for verifying the identity of an owner of the security clearance card, wherein said security clearance card comprises:
    a plurality of data portions stored in the security clearance card wherein at least one of said plurality of data portions comprises at least one biometric identifier of the owner of the security clearance card; and
    at least first and second different security levels, wherein at least one of said plurality of data portions is associated with at least the first security level, and at least one of said plurality of data portions is associated with at least the second security level.

10. A security clearance card according to claim 9, further comprising a data storage medium located on the security clearance card, wherein at least one of said plurality of data portions is stored in said data storage medium.

11. A security clearance card according to claim 10, wherein said data storage medium is a bar code containing data portions encoded therein.

12. A security clearance card according to claim 9, further comprising a CD-ROM, wherein at least one of said plurality of data portions is stored in said CD-ROM.

13. A security clearance card according to claim 9, wherein said card comprises a CD-ROM having data portions stored herein and a data storage medium located on a face of said CD-ROM.

14. A security clearance card according to claim 9, wherein individual data of said plurality of data portions are categorized as one of identity data, and other data, wherein identity data is data used to verify the owner of said card, field data is data associated with the owner of said card, and other data is data of interest stored on said card.

15. A security clearance card according to claim 9, wherein said card comprises a CD-ROM having data portions stored therein and a data storage medium printed on a face of said CD-ROM, and wherein said data storage medium has stored therein at least one of the identity data and field data and said CD-ROM has stored therein at least one of identity data, field data, and other data.

16. A security clearance card according to claim 9, wherein at least one of said plurality of data portions comprises data associated with at least one of the owner and an object associated with the owner.

17. A security clearance card according to claim 9, wherein at least one of said plurality of data portions is encrypted using a selected encryption technique.

18. A security clearance card according to claim 17, wherein the encryption technique used to encrypt the data is based on the security level associated with the data.

19. A security clearance card according to claim 18, wherein a plurality of said data portions each associated with corresponding different security levels, and wherein each data portion is encrypted with an encryption technique based on the security level associated therewith.

20. A security clearance card according to claim 17, wherein the plurality of encryption techniques comprises a plurality of algorithms that are dynamically generated block cipher encryption algorithms.

21. A security clearance card according to claim 17, wherein the plurality of encryption techniques comprises an encryption technique based to the biometric identifier of the owner.

22. A security clearance card according to claim 17, wherein the plurality of encryption techniques comprises an encryption technique based on a creation date of the security clearance card.

23. A security clearance card according to claim 9, wherein at least one of said plurality of data portions comprises a data log containing a record of events related to the security clearance card.

24. A security clearance card according to claim 23, wherein said data log contains a record of modifications made to data portions stored on said card.

25. A security clearance card according to claim 23, wherein said data log contains a record relating to creation of the card.

26. A security clearance card according to claim 25, wherein said data log contains at least one of the date the card was created, location of where the card was created, and a biometric associated with personnel who created the card.

27. A security clearance card for verifying the identity of an owner of the security clearance card, wherein said security clearance card comprises:

a plurality of data portions stored in the security clearance cards wherein at least one of said plurality of data portions comprises at least one biometric identifier of the owner of the security clearance card; and a plurality of security levels, wherein each of said plurality of data portions is associated with one of said plurality of security levels, wherein said data log contains a record relating to creation of the card, and said data log contains at least one of the date the card was created, location of where the card was created, and a biometric associated with personnel who created the card.

* * * * *